United States Patent [19]
Torii

[11] Patent Number: 5,512,951
[45] Date of Patent: Apr. 30, 1996

[54] AUTO-FOCUSING APPARATUS

[75] Inventor: Reiko Torii, Tokyo, Japan

[73] Assignee: Sony Corporation, Tokyo, Japan

[21] Appl. No.: 371,481

[22] Filed: Jan. 11, 1995

Related U.S. Application Data

[63] Continuation of Ser. No. 66,584, May 25, 1993, abandoned.

[30] Foreign Application Priority Data

Jun. 2, 1992 [JP] Japan .................................. 4-141468

[51] Int. Cl.$^6$ .................................................. H04N 5/232
[52] U.S. Cl. ................................................ 348/353; 348/345
[58] Field of Search ...................... 348/345, 353, 348/354, 355, 356; 354/402; H04N 5/232

[56] References Cited

U.S. PATENT DOCUMENTS

| | | | |
|---|---|---|---|
| 5,097,282 | 3/1992 | Itoh et al. | 354/402 |
| 5,128,768 | 7/1992 | Suda et al. | 348/352 |
| 5,150,217 | 9/1992 | Senuma et al. | 348/353 |
| 5,212,516 | 5/1993 | Yamada et al. | 354/402 |
| 5,235,428 | 8/1993 | Hirota et al. | 348/355 |

FOREIGN PATENT DOCUMENTS

| | | | |
|---|---|---|---|
| 0125575 | 5/1991 | Japan | H04N 5/232 |
| 4111684 | 4/1992 | Japan | H04N 5/232 |

*Primary Examiner*—Michael T. Razavi
*Assistant Examiner*—Andrew B. Christensen
*Attorney, Agent, or Firm*—William S. Frommer; Alvin Sinderbrand

[57] ABSTRACT

An auto-focusing apparatus which obtains an evaluation value from a contrast component of a video signal and performs focus adjustment so that the evaluation value will be maximum, comprises: measurement frame setting means for setting a first frame and a second frame on the screen to obtain the evaluation value; and evaluation value generating means for obtaining a first evaluation value and a second evaluation value from the first frame and the second frame. Focus adjustment is performed by selecting the first frame or the second frame according to changes of the first evaluation value and the second evaluation value when a focus lens is moved in a very small amount.

6 Claims, 4 Drawing Sheets

AUTO-FOCUSING APPARATUS

This application is a continuation of application Ser. No. 08/066,584, filed May 25, 1993, now abandoned.

BACKGROUND OF THE INVENTION

1. Field of the Invention

This invention relates to an auto-focusing apparatus which obtains an evaluation value from a contrast component of a video signal and performs focus adjustment so that the evaluation value will be at a maximum.

2. Description of the Prior Art

In the existing picture-processing auto-focusing apparatus, auto-focusing is performed by driving a focus lens so that an evaluation value which is obtained by a contrast component of a video signal will be at a maximum, based on a concept that focalization is completed when the high-frequency component of the video signal is at a maximum (FIG. 1). More specifically, the direction and speed of the focus lens are controlled by the sign and scale of a change ($\Delta y$) in an evaluation value, when a focus lens is moved in a very small amount of length ($\Delta x$).

Which part in the screen will be an object of auto-focusing is determined by a frame on the screen to obtain the evaluation value (called hereafter "measurement frame"). Demerits vary with whether the measurement frame is large or small. For example, when the measurement frame is large, focusing is made at a background, if a contrast at the background is striking. This is what is called "background focusing" (FIG. 2B). On the other hand, when the measurement frame is small, an object may not be contained in the measurement frame (FIG. 2A), or an edge may not be contained (FIG. 2C). In FIGS. 2A, 2B, and 2C, reference character W shows a measurement frame and reference numeral 100 denotes a screen.

As mentioned above, an optimum measurement frame differs with contents of objects. It has therefore been difficult to determine an adequate size of the measurement frame.

OBJECTS AND SUMMARY OF THE INVENTION

It is, therefore, an object of this invention to set the size of the measurement frame to an adequate value in accordance with the contents of an object so as to permit an adequate focusing operation.

According to an aspect of the invention, there is provided an auto-focusing apparatus which obtains an evaluation value from a contrast component of a video signal and performs focus adjustment so that the evaluation value will be at a maximum, comprising:

measurement frame setting means for setting a first frame and a second frame on the screen to obtain the evaluation value; and evaluation value generating means for obtaining a first evaluation value and a second evaluation value from the first frame and the second frame, wherein focus adjustment is performed by selecting the first frame or the second frame according to changes of the first evaluation value and the second evaluation value when a focus lens is moved in a very small amount.

When a focus lens is moved in a very small amount, the first and second evaluation values vary with the contents of an object. If both first and second evaluation values vary, focus adjustment is made so that focusing will be made nearer at relatively near to a central object by performing focus adjustment according to an evaluation value obtained at a position relatively near to the central position. This can prevent what is called background focusing. When only one of the first and second evaluation values changes, failure of the focus adjustment can be avoided by performing the focus adjustment according to the changed evaluation values.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
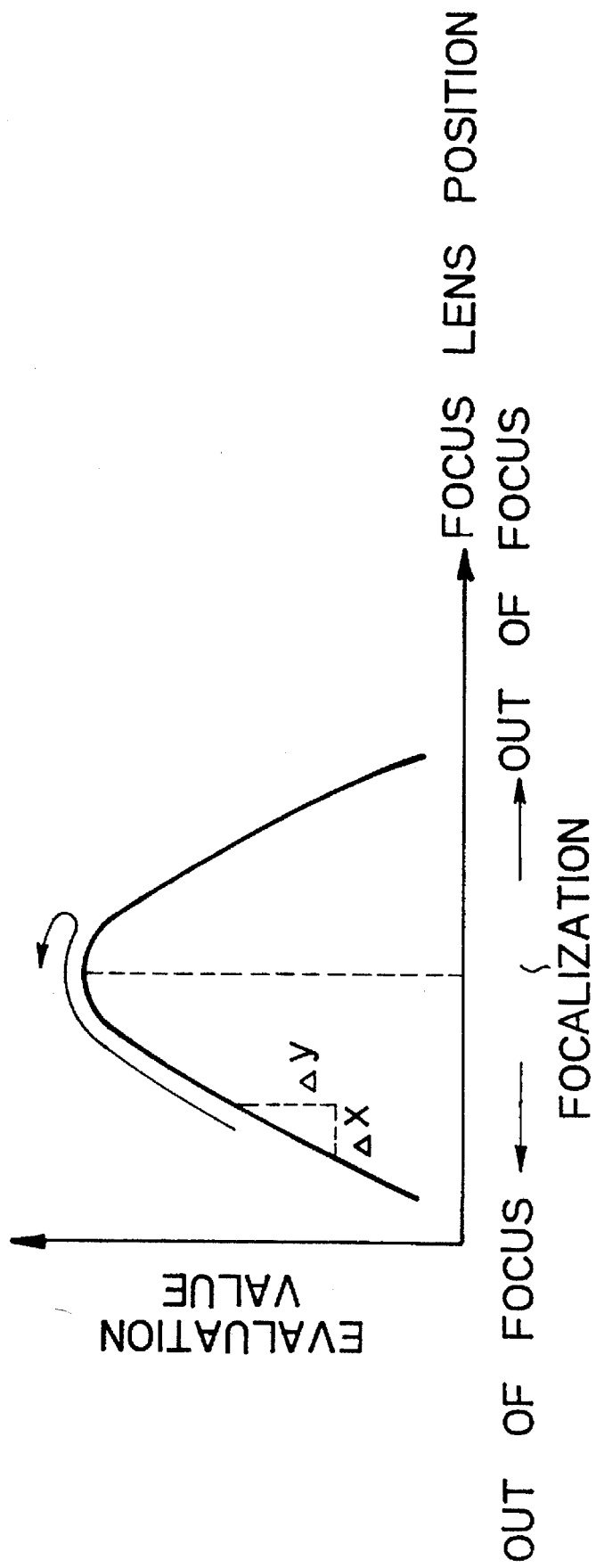
FIG. 1 is a graph showing the relation between the focus lens position and the evaluation value.
Figure 2A:
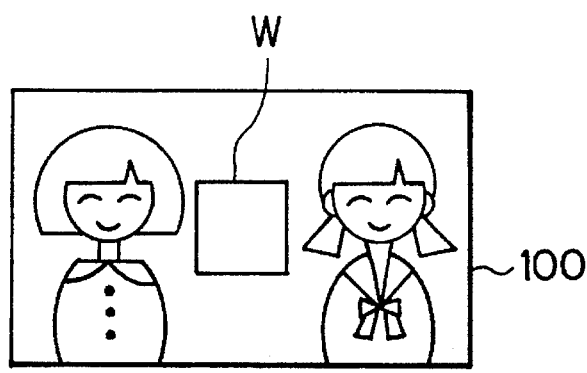
FIGS. 2A to 2C are schematic diagrams for explaining the existing examples.
Figure 2B:
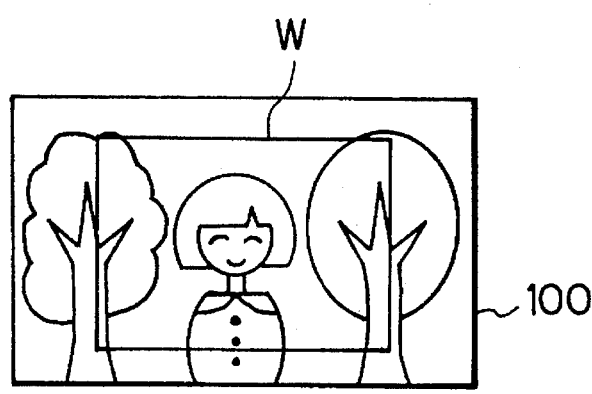
Figure 2C:
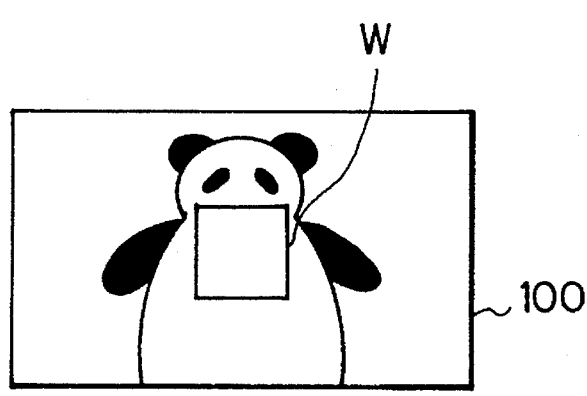
Figure 3:
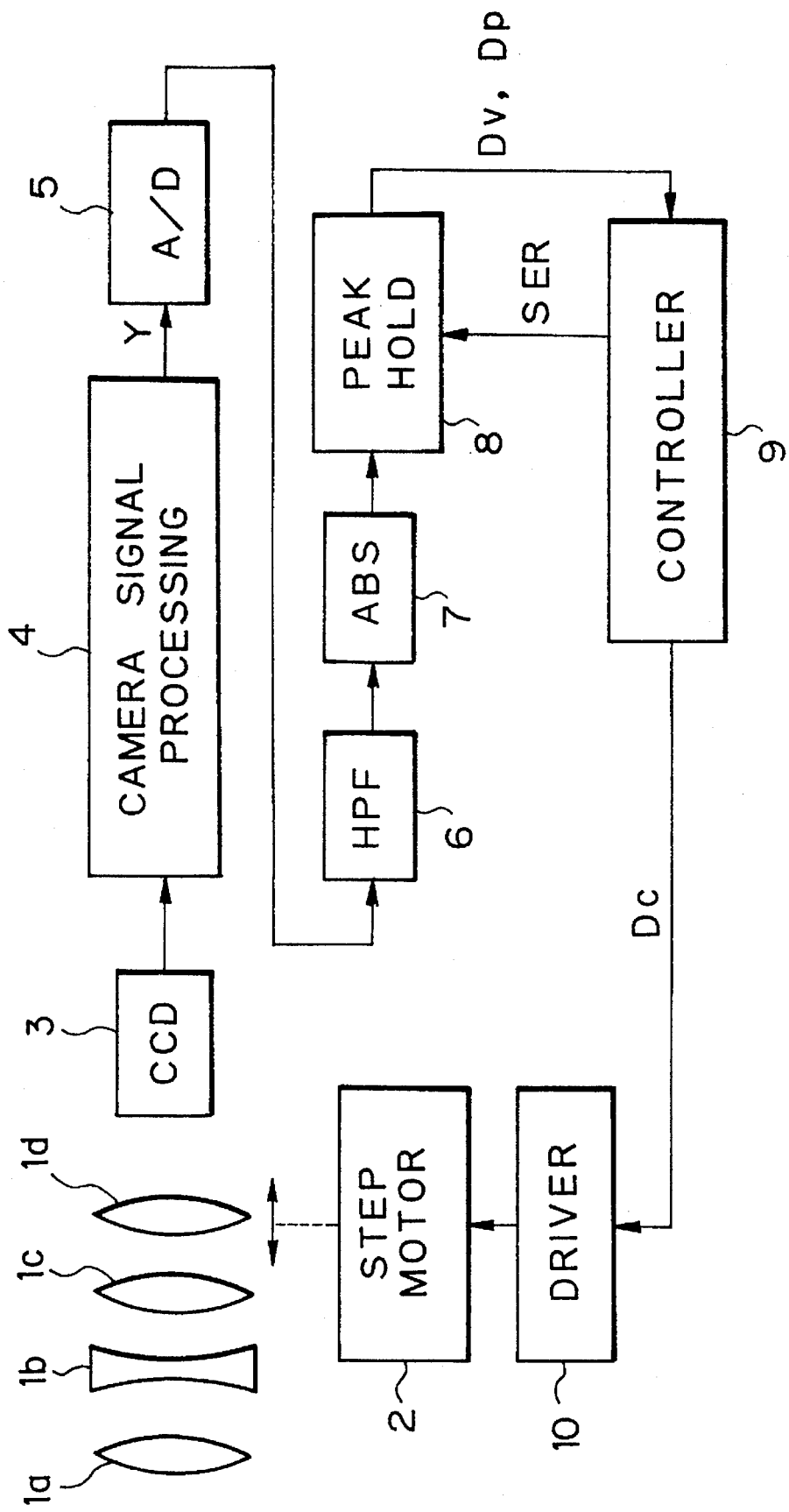
FIG. 3 is a block diagram showing the configuration of an embodiment of the invention.

An embodiment of this invention will be described below with reference to FIG. 3. In FIG. 3, reference numerals 1a to 1d denote a lens assembly, in which reference numerals 1a and 1c denote fixed lenses, reference numeral 1b denotes a zoom lens, and reference numeral 1d denotes a focus lens. Focus adjustment is effected by moving the focus lens 1d by means of a step motor 2 in the direction of an optical axis.

Reference numeral 3 denotes a CCD solid state image pickup device. An image pickup signal from the device 3 is supplied to a camera signal processing circuit 4. A video signal (luminance signal) Y supplied from the signal processing circuit 4 is converted into a digital signal by an A/D converter 5, and is supplied to a high-pass filter 6. An output signal from the high-pass filter 6 is changed into an absolute value by an absolute value circuit 7, and is supplied to a peak hold circuit 8, as a contrast component.

To the peak hold circuit 8, frame data S ER specifying the measurement frame is supplied by a controller 9. In the peak hold circuit 8, an evaluation value (maximum value) is detected from the signals in the measurement frame, among signals corresponding to each screen, which are output from the absolute value circuit 7. From the peak hold circuit 8, output are data Dv for evaluation value, and data Dp indicating the screen position in which the evaluation value is obtained. The data Dv and Dp are supplied to the controller 9. In the controller 9, based on the data Dv and Dp, there is formed control data Dc to control the rotation of the step motor 2. Then, the control data Dc is supplied to a driver 10 of the step motor 2. Thus, focus adjustment is performed.

The operation of the measurement frame by the frame data S ER from the controller 9, and the focus adjustment operation by the control data Dc will now be described in detail.

Figure 4:
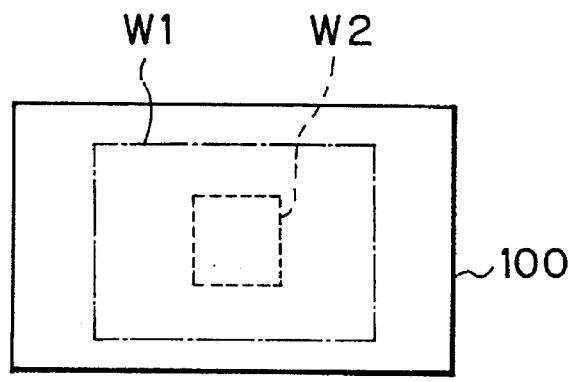
FIG. 4 is a schematic diagram for explaining the embodiment.

First, measurement frames, that is, a large frame w1 and a small frame W2 are set by the frame data S ER, on the screen 100 (FIG. 4). For the large frame W1 and small frame W2, changes of evaluation value (Δy) are detected when the focus lens 1d is moved a very small amount (Δx). Then, different focus adjustments are made for the following cases (1) to (3), respectively.

(1) When Δy is detected in the small frame W2.

(2) When Δy is not detected in the small frame W2, but Δy is detected in the large frame W1.

(3) When Δy is detected neither in the small frame W2, nor in the large frame W1.

In most of the cases (1), focusing tends to be made relatively near to a central object. For this reason, focus adjustment is made by moving the position of the focus lens 1d by the control data Dc so that the evaluation value in the small frame W2 will be at a maximum irrespective as to whether or not Δy is detected in the large frame W1.

In the case (3), no focus adjustment is made on judgment that focalization is completed.

Figure 5A:
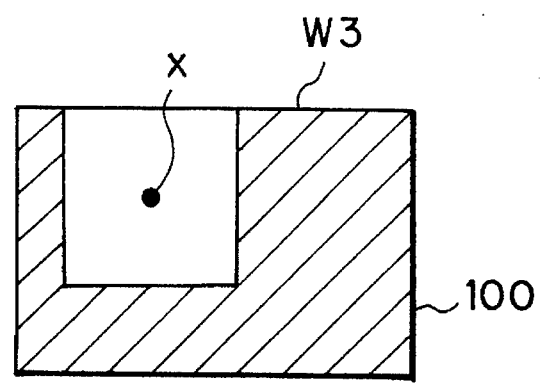
FIGS. 5A and 5B are schematic diagrams for explaining the embodiment.
Figure 5B:
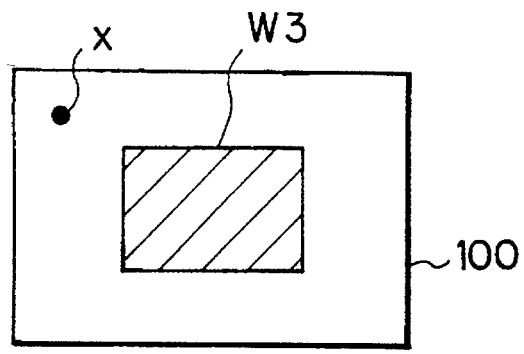

In the case (2), there remains a possibility that an evaluation value detected in the large frame W1 may have been obtained from a background. For example, an image of a tree or the sun in the background of the large frame W1 may cause an evaluation value to be detected at the background and not for the object in the foreground. It is therefore necessary to perform the following operation in parallel, while performing focus adjustment based on an evaluation value for the large frame W1. In particular, a frame W3 is set, which excludes the position x for which an evaluation value is obtained by the frame data S ER for the large frame W1 on the screen 100. (Two examples of frame W3 are indicated with slant lines in FIGS. 5A and 5B, resepectively) When the focus lens 1d is moved a very small amount (Δx), Δy is detected in the frame W3. If Δy is not equivalent to that obtained in the large frame W1, focus adjustment is made based on an evaluation value obtained relatively near to the central position in the screen 100, which is selected in the evaluation values obtained in the large frame W1 and frame W3. This reduces occurrence of a phenomenon in which focusing is made at a background.

For the case (2), the following step equally can be performed. Δy is detected by specifying the frame W3 which excludes the position x for which an evaluation value currently used as reference value detected from large frame W1. Then, it is confirmed that Δy detected in the frame for which the above evaluation value is obtained. If coincidence of the value Δy is not made, focus adjustment is made based on an evaluation value obtained nearer at the central position. This step can be repeated several times, which results in reduction of background focusing.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

According to the invention, in correspondence with change of the first and second evaluation values when the focus lens is moved in a very small amount, the measurement frame is selected automatically, adequate auto-focusing operation is obtained according to contents of an object. For example, when both first and second evaluation values change, focus adjustment is made based on an evaluation value obtained nearer at the central position, which permits focusing at the center of an object, and prevents background focusing. On the other hand, one of the first and second evaluation values changes, focus adjustment is made according to the changed value, eliminating the possibility that auto-focusing operation cannot be made.

What is claimed is:

1. An auto-focusing apparatus which obtains an evaluation value from a contrast component of a video signal representing an image on a screen, and which performs a focus adjustment of a focus lens so that the evaluation value will be at a at a maximum value, comprising:

measurement frame setting means for setting a first frame and a second frame which are substantially centered at the center of said screen with said second frame being smaller than said first frame;

evaluation value generating means for obtaining a first evaluation value and a second evaluation value from a first position in said first frame and from a second position in said second frame, respectively;

means for detecting whether said second evaluation value is generated;

means responsive to the absence of said second evaluation value for setting a third frame, wherein said third frame is offset from the center of said screen and excludes a portion of the screen surrounding said first position for which said first evaluation value is based, and for generating a third evaluation value from said third frame;

means also responsive to the absence of said second evaluation value for selecting either said first evaluation value or said third evaluation value whichever is based on a position nearer to the center of said screen; and means for effecting said focus adjustment based on said second evaluation value when detected or, in the absence of said second evaluation value, based on the selected first or third evaluation value.

2. The auto-focusing apparatus according to claim 1, wherein a plurality of different frames are set as said third frame.

3. An auto-focusing apparatus comprising:

a lens assembly for collecting lights from an imaged object;

an image pickup device for converting the lights from said lens assembly into an electric signal;

a camera signal processing circuit for converting said electrical signal from said image pickup device into a video signal;

a peak hold circuit for holding a peak value of said video signal from said camera signal processing circuit;

measurement frame setting means for setting a first frame and second frame to evaluate an output signal from said peak hold circuit;

evaluation value generating means for obtaining a first evaluation value and a second evaluation value from a first position in said first frame and from a second position in said second frame, respectively;

means for detecting whether said second evaluation value is generated;

means responsive to the absence of said second evaluation value for setting a third frame, wherein said third frame is offset from the center of said screen and excludes a portion of the screen surrounding said first position for which said first evaluation value is based, and for generating a third evaluation value from said third frame;

means also responsive to the absence of said second evaluation value for selecting either said first evaluation value or said third evaluation value whichever is based on a position nearer to the center of said screen; and a motor for driving said lens assembly according to said second evaluation value when detected or, in the absence of said second evaluation value, based on the selected first or third evaluation value.

4. The auto-focusing apparatus according to claim 3, wherein a plurality of different frames are set as said third frame.

5. The auto-focusing apparatus according to claim 3, wherein the area of said first frame is equal to approximately 60% of the area of the screen.

6. The auto-focusing apparatus according to claim 3, wherein the area of said second frame is equal to approximately ¼ of the area of said first frame.

* * * * *